J. HOFFMAN.
KITCHEN FORK.
APPLICATION FILED FEB. 8, 1916.
1,189,692.
Patented July 4, 1916.
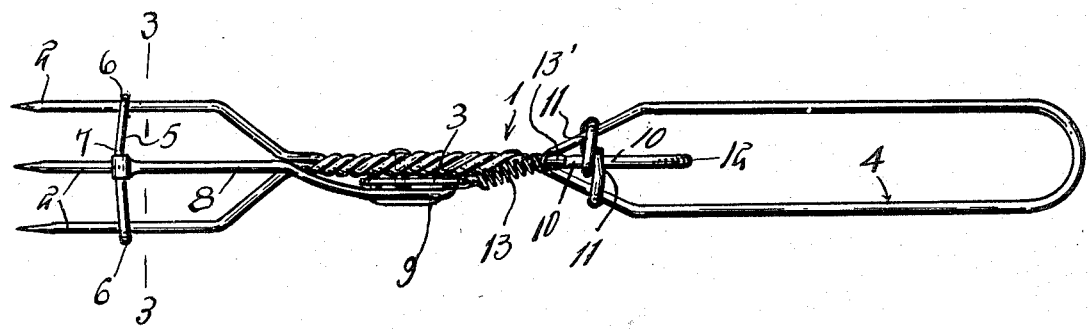
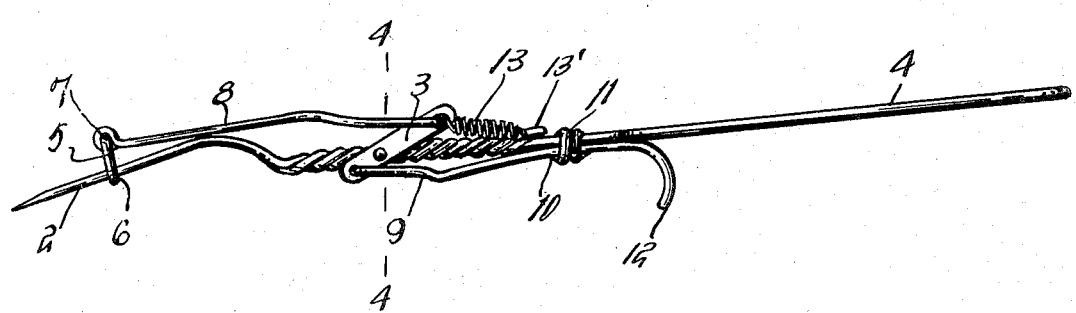
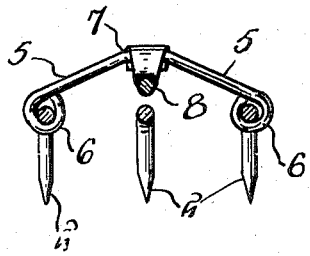
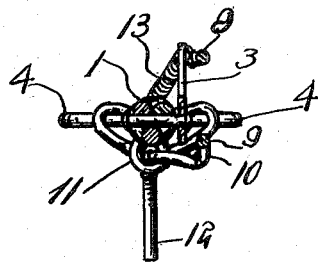
Witnesses
J. C. Simpson
A. Ellison
Inventor
J. Hoffman.
By Chandler Chandler
Attorneys

UNITED STATES PATENT OFFICE.

JOHN HOFFMAN, OF MEDINA, NEW YORK.

KITCHEN-FORK.

1,189,692.

Specification of Letters Patent.     Patented July 4, 1916.

Application filed February 8, 1916.   Serial No. 77,046.

*To all whom it may concern:*

Be it known that I, JOHN HOFFMAN, a citizen of the United States, residing at Medina, in the county of Orleans, State of New York, have invented certain new and useful Improvements in Kitchen-Forks; and I do hereby declare the following to be a full, clear, and exact description of the invention, such as will enable others skilled in the art to which it appertains to make and use the same.

The present invention is directed to improvements in kitchen forks, and has for its object to combine with an article of this type, means whereby food which may become impaled upon the tines of the fork can be conveniently removed.

A further object of the invention is to provide an attachment for forks which can be easily operated so as to dislodge the food from the tines of the fork without the necessity of the user grasping the article of food with the fingers.

With these and other objects in view, this invention resides in the novel features of construction, formation, combination and arrangement of parts to be hereinafter more fully described, claimed and illustrated in the accompanying drawing, in which:—

Figure 1 is a plan view of a fork, equipped with the device. Fig. 2 is a side view. Fig. 3 is a sectional view on line 3—3 of Fig. 1. Fig. 4 is a similar view on line 4—4 of Fig. 2.

Referring to the drawing 1 indicates the handle of the fork, and 2 the tines thereof, all of which are of a conventional form.

The attachment comprises a bar 3 which is pivotally connected intermediate its ends to the handle 1, and between the tines and grip 4 of the handle.

A curved rod 5 is provided, and has its ends provided with eyes 6, and is provided intermediate its ends with a straight part 7, the eyes 6 slidably engaging the outer tines 2 of the fork. A link 8 is provided and has its outer end pivotally connected to the part 7 of the rod 5, the inner end of said link being pivotally connected to the upper end of the bar 3. To the lower end of the bar 3 is pivotally connected one end of the angle arm 9, the other end of said arm terminating in a rod 10 which slidably engages the guide 11, mounted on the grip 4, and has its extreme outer end provided with a finger-piece 12.

By providing the angle arm 9, it is obvious that when the rod 10 is moved rearwardly, that the bar 3 will be rocked, thus moving the link 8 forwardly, which action causes the rod 5 to move forwardly a sufficient distance to dislodge any article of food which may be impaled on the tines 2. To return the rod 5 to its normal or inoperative position, a coil spring 13 is provided and has one of its terminals connected to the rear end of the link 8, while the other terminal of said spring is suitably connected to the rear end of the strand 13′ forming the center tine 2.

From the foregoing description it will be seen that should an article of food be impaled on the tines 2 that it is only necessary for the user to engage the finger-piece 12 with one of the fingers and to draw the rod 10 rearwardly, thus forcing the rod 5 forwardly, and at the same time causing the spring 13 to expand.

As soon as the finger-piece 12 is released, the spring 13 will return the rod 5 to its normal or inoperative position.

What is claimed is:—

A fork attachment comprising a rod, said rod being slidably connected to the tines of the fork, a bar pivotally connected to the handle of the fork, a link pivotally connecting the rod and one end of the bar, a spring connecting the rod and handle, an angle arm having one end pivotally connected to the bar and having its other end terminating in a rod, a guide carried by the handle grip of the fork and slidably engaged by the last named rod, and a finger-piece carried by the said last named rod, as and for the purpose set forth.

In testimony whereof, I affix my signature, in the presence of two witnesses.

JOHN HOFFMAN.

Witnesses:
   LAWRENCE HOFFMAN,
   FRED. C. DOWNS.